United States Patent
Bastien et al.

(10) Patent No.: US 6,307,668 B1
(45) Date of Patent: Oct. 23, 2001

(54) ULTRA-WIDE BANDWIDTH FIBER BASED OPTICAL AMPLIFIER

(75) Inventors: Steven P. Bastien, Narragansett; Shijun Jiang; Mala Krishnan, both of Wakefield, all of RI (US); Tariq Manzur, Storrs, CT (US)

(73) Assignee: Optigain, Inc., Peace Dale, RI (US)

( * ) Notice: Subject to any disclaimer, the term of this patent is extended or adjusted under 35 U.S.C. 154(b) by 0 days.

(21) Appl. No.: 09/411,495

(22) Filed: Oct. 4, 1999

(51) Int. Cl.[7] ....................................................... H01S 3/00
(52) U.S. Cl. ..................................... 359/337.1; 359/341.5; 359/349
(58) Field of Search ..................................... 359/341, 124, 359/337.1, 341.5, 349

(56) References Cited

U.S. PATENT DOCUMENTS

| | | | |
|---|---|---|---|
| 3,825,845 | 7/1974 | Angelbeck et al. | 330/4.3 |
| 4,200,846 | 4/1980 | Stark, Jr. et al. | 331/94.5 |
| 5,111,334 | 5/1992 | Heidemann | 359/341 |
| 5,185,826 | 2/1993 | Delavaus | 385/24 |
| 5,196,958 | 3/1993 | VErbeek et al. | 359/344 |
| 5,392,154 | 2/1995 | Chang et al. | 359/341 |
| 5,452,116 | 9/1995 | Kirkby et al. | 359/124 |
| 5,604,627 | 2/1997 | Kohn | 359/341 |
| 5,801,858 | 9/1998 | Roberts et al. | 359/114 |
| 6,049,417 | * 4/2000 | Srivastava | 359/341 |
| 6,104,527 | * 8/2000 | Yang | 359/341 |
| 6,151,160 | * 11/2000 | Ma et al. | 359/341 |

OTHER PUBLICATIONS

M. Yamada et al, Broadband and Gain–Flattened Amplifier Composed of a 1.55um–Band And a 1.58um–Band ER3–Doped Fibre Amplifier in a Parallel Configuration, Apr. 10, 1997, Electronics Letters, vol. 33, No. 8, p. 710.

Y. Sun et al., 80nm Ultra–wideband Erbium–Doped Silica Fibre Amplifier, Nov. 6, 1997, Electronics Letters, vol. 33, No. 23, p. 1965.

* cited by examiner

*Primary Examiner*—Mark Hellner
(74) *Attorney, Agent, or Firm*—Barlow, Josephs & Holmes

(57) ABSTRACT

An ultra-wide bandwidth optical amplifier for the 1.5 $\mu$m optical band divides the 1520 nm–1610 nm bandwidth into three narrow bandwidths, i.e. C1 (1520 nm–1541 nm), C2 (1541 nm–1565 nm) and L (1565 nm–1610 nm), and uses three separate erbium doped fiber amplifier blocks, configured in parallel relation and individually optimized to separately amplify the respective bandwidth. Multipath interference is controlled by constructing all three amplifier blocks with the same optical transmission length. The C1 and C2 band amplifier blocks, which include shorter erbium doped fibers than the L band amplifier block, are physically lengthened using lengths of single mode fiber so that the total length of the optical transmission path of each amplifier block is generally equal. Fiber lengths are controlled to within 500 microns. Selected amplifier blocks further include delay control devices which selectively delay signals passing through the respective amplifier block to provide fine adjustment to signal recombination.

19 Claims, 3 Drawing Sheets

ULTRA-WIDE BANDWIDTH FIBER BASED OPTICAL AMPLIFIER

BACKGROUND OF THE INVENTION

The present invention relates to optical amplifiers, and more particularly relates to an ultra-wide bandwidth fiber based optical amplifier which divides the erbium wavelength band (1520 nm–1610 nm) into three separate bands, separately amplifies each of the three bands in parallel configuration, and then recombines the bands to provide uniform gain flatness over the entire bandwidth.

The design of wavelength division multiplexed (WDM) systems in the 1.5 μm range is currently constrained by the limited bandwidth available from conventional erbium doped fiber amplifiers. The presently available bandwidth is limited to about 20 nm because of the highly structured gain spectrum of conventional erbium doped fibers. The use of gain equalization filters can extend the usable bandwidth up to about 40 nm (about 1525 nm to about 1565 nm). This 40 nm gain spectrum allows the use of more channels in a WDM system. However, proposed 10 Gb/s systems will require the use of the entire 80–90 nm bandwidth with very small channel spacings.

One possible solution to provide greater bandwidth would be to provide an erbium doped fiber that has a gain spectrum over a greater bandwidth. This would allow a single fiber amplifier to provide a gain spectrum over a greater bandwidth. Erbium doped fluoride fibers have shown gain spectrums of 25 nm without gain equalization filters, and newer, tellurite erbium doped fibers have gain spectrums in different ranges, but the gains are highly non-uniform. To date, it has been impossible to provide a single erbium doped fiber which has a uniform gain spectrum over more than a 25 nm bandwidth.

Another proposed solution is to divide the erbium bandwidth into two bands and separately amplify the separated bands in parallel configuration. This concept allows the use of two different amplifiers which can be optimized for a flat gain region within a specific band. This solution was proposed in the Apr. 10, 1997 publication of Electronics Letters (Vol. 33. No. 8). The article describes a broadband amplifier which divides the available bandwidth into two bands a 1520 nm–1570 nm band (1554 nm band) and a 1570 nm–1610 nm band (1.58 μm band). The configuration of each band is based on a cascade configuration with a 980 nm pumped EDFA and a 1480 nm pumped EDFA using a combination of silica and fluoride fibers to optimize gain flatness. The EDFA unit for the 1.55 μm band showed a relatively flat gain spectrum from 1530 nm–1560 nm, and the EDFA unit for the 1.58 μm band showed a relatively flat gain spectrum from 1576 nm–1600 nm. The result is a wide bandwidth amplifier having a 54 nm flat gain spectrum. Although demonstrating an improved gain bandwidth of 14 nm over the prior single amplifier systems, this parallel configuration still loses significant bandwidth between the optimum gain spectrums, i.e. between 1560 nm and 1576 nm.

An 80 nm gain flattened amplifier using only silica erbium doped fibers was described in the Nov. 6, 1997 publication of Electronic Letters (Vol. 33 No. 23). Expansion of the gain flattened bandwidth from 54 nm to 80 nm was achieved by using two separate EDFA sections. The entire bandwidth is amplified in a first common section. After the first section, the optical channels are split into two bands, a C-band with a range of 1520 nm–1570 nm and an L-band with a range of 1570 nm–1620 nm. The C-band branch has a single stage amplifier, while the L-band branch has a two stage amplifier. The gain bandwidth in the C-band was shown to be 36.9 nm while the gain bandwidth in the L-band was shown to be 43.4 nm giving a total gain bandwidth of 80.3 nm. While the system demonstrates an even greater gain spectrum, the gain spectrum in both the C-band and L-band are non-uniform which makes real-life utilization of the entire gain spectrum difficult. The author's solution to improve gain spectrum flatness in the L-band is to change the inversion level, however, this comes at the expense of bandwidth. Accordingly, the entire 80 nm bandwidth would not be usable in an actual commercial device.

Furthermore a significant concern which prevents practical implementation of these proposed parallel designs is the problem of multipath interference (MPI) which is a phenomenon which naturally occurs when recombining two or more wavelength bands into a single fiber. Neither article discusses the problem or mentions an) possible solution to the problem.

Accordingly, while there have been attempts to provide a wide bandwidth amplifier having a greater gain spectrum, none of the present solutions solves the ultimate challenge of providing uniform gain flatness over the entire 1.5 μm bandwidth.

SUMMARY OF THE INVENTION

The present invention seeks to solve the prior art shortcomings by dividing the erbium wavelength band into three separate bandwidths 1520 nm–1541 nm (C1 band), 1541–1565 (C2 band) and 1565–1610 (L band) and separately amplifying each bandwidth with a specially designed amplifier block optimized to provide a flat gain spectrum within the limited bandwidth. The amplifier then recombines the separately amplified band to provide an ultra-wide bandwidth amplifier with a flat gain spectrum over the entire 90 nm bandwidth.

The concept of splitting the C band into two separate bands may seem controversial at first since it clearly adds complexity where none would seem to be needed. However, it will be shown herein that there are significant advantages to be found in this approach. The underlying physics of each of the three bands is significantly different, and these differences have many subtle effects on gain, noise figures, output power, saturation/inversion conditions, and required pumping power. By separating the conventional C band into two separate C1 and C2 bands, the lower limit of the C1 band can be broadened to include 1520 nm with the proper choice of glass host, thus gaining up to 5 nm of bandwidth and compensating for channels lost at the intersection of the C1 and C2 bands. In the C1 band, there is an inherent gain peak at 1530 nm. Eliminating this peak becomes much easier with a total C1 bandwidth of 20 nm versus 35 nm for the conventional (1525–1565 nm) C bandwidth. This will allow for implementation of a gain equalization filter that optimizes performance in this band without imposing tradeoffs in other adjacent bands. In the C2 band there will be no gain equalization filtering needed due to the inherent gain flatness of this band. Optimally designed Erbium doped fiber will be used in this band to further improve gain flatness. The splitting of the conventional C band will also reduce the effects of spectral hole burning between the 1530 nm peak and the 1550 nm peak. In addition, dispersion compensation becomes easier to implement due to the reduced bandwidth of each separate band.

The present invention also addresses the challenges of separating and then efficiently recombining multiple wavelength bands, which typically causes a dip in gain at the intersection of the two bands and also causes multi-path interference (MPI). The problem is resolved by constructing all three amplifier blocks with the same optical transmission length. The C1 and C2 band amplifier blocks, which include shorter erbium doped fibers than the L band amplifier block, are physically lengthened using lengths of single mode fiber so that the total length of the optical transmission path of each amplifier block is generally equal. Fiber lengths are controlled to within 500 microns. Selected amplifier blocks further include delay control devices which selectively delay signals passing through the respective amplifier block to provide further fine adjustment to signal recombination.

More specifically, the wide bandwidth optical amplifier of the present invention includes first, second and third amplifier blocks. A demultiplexer device splits the 1.5 μm wavelength band into first (C1), second (C2) and third (L) bandwidths, and outputs the respective bandwidths to the input ends of the first, second and third amplifier blocks. The first bandwidth (C1) has a range from about 1520 nm to about 1541 nm, the second bandwidth (C2) has a range from about 1541 nm to about 1565 nm, and the third bandwidth (L) has a range from about 1565 nm to about 1610 nm. A demultiplexer multiplexer connected to the output ends of the first, second and third amplifier blocks recombines the first, second and third bandwidths after being amplified.

Each of the amplifier blocks includes an optical amplifier assembly constructed and arranged for amplifying the respective bandwidth with a substantially flat gain profile. Pump input for each of the amplifier blocks is provided by a pump laser which delivers high pump power (0.5 W) into a single mode fiber. Existing erbium fiber designs allow the gain profile of the C2 band to have a gain flatness of <1 dB with a 25 dB gain. The C1 band amplifier block and the L band amplifier block each utilize a gain equalization filter to provide about the same gain and flatness. Each of the amplifier blocks further implements an automatic gain control system which maintains constant gain for each channel, irrespective of variations in input power and number of channels.

Each amplifier block is constructed to have the same optical transmission path length regardless of the different lengths of the erbium doped fibers required for optical amplification in each block. In this regard, the L band erbium fiber is significantly longer than the erbium fibers required for either of the C1 and C2 bands. Since the L band has the longest erbium doped fiber it is used as the basis for the standard length of the optical transmission path. The optical transmission lengths of the C1 and C2 band amplifier blocks are lengthened using lengths of single mode fiber spliced into the amplifier block. These lengths of single mode fiber allow the lengths of the optical transmission paths of the C1 and C2 bands to roughly approximately the length of the optical transmission path of the L band. MPI is further reduced by the use of delay control devices, such as piezoelectric distance controls, fiber stretchers, and lithium niobate crystals, in the C1 and L amplifier blocks to selectively delay signals passing through these amplifier blocks. The use of these highly sensitive and selectively controllable delay devices will permit operators to fine tune wavelength recombination and reduce MPI.

Accordingly, among the objects of the present invention are: the provision of an ultra-wide bandwidth fiber based optical amplifier having a flat gain spectrum over the entire 1520nm–1610 nm bandwidth, the provision of such an amplifier which minimizes multi-path interference (MPI); the provision of such an amplifier which provides a wide-band gain of >25 dB per channel; the provision of such an amplifier which has consistent low noise of <6 dB across the entire band; the provision of such an amplifier having a gain flatness of <1 dB for all useful channels; the provision of such an amplifier having an automatic gain control; and the provision of such an amplifier having modular components for enhanced field serviceability and upgradeability.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
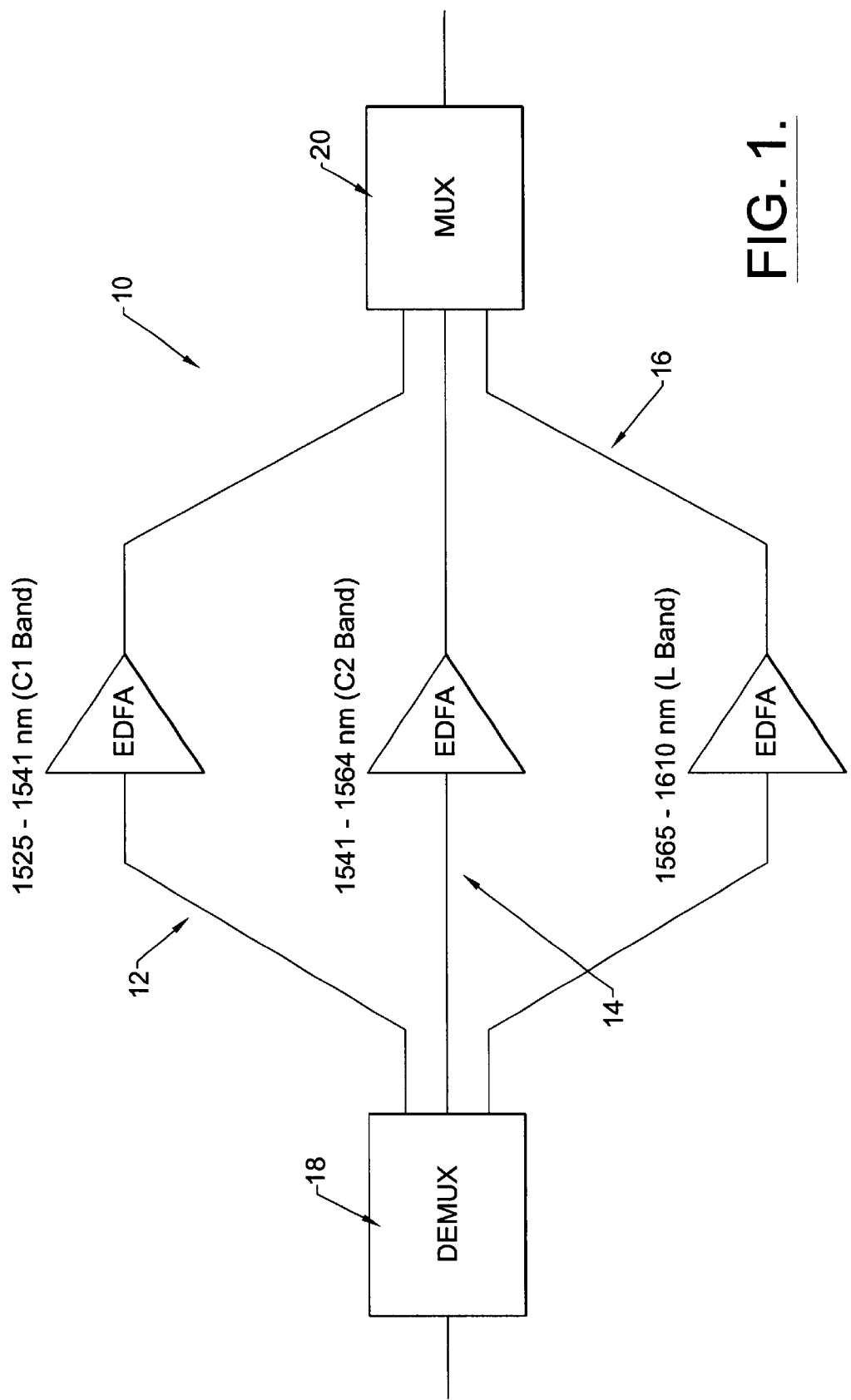
FIG. 1 is a general schematic illustration of the ultra-wide bandwidth fiber based optical amplifier of the present invention.
Figure 2:
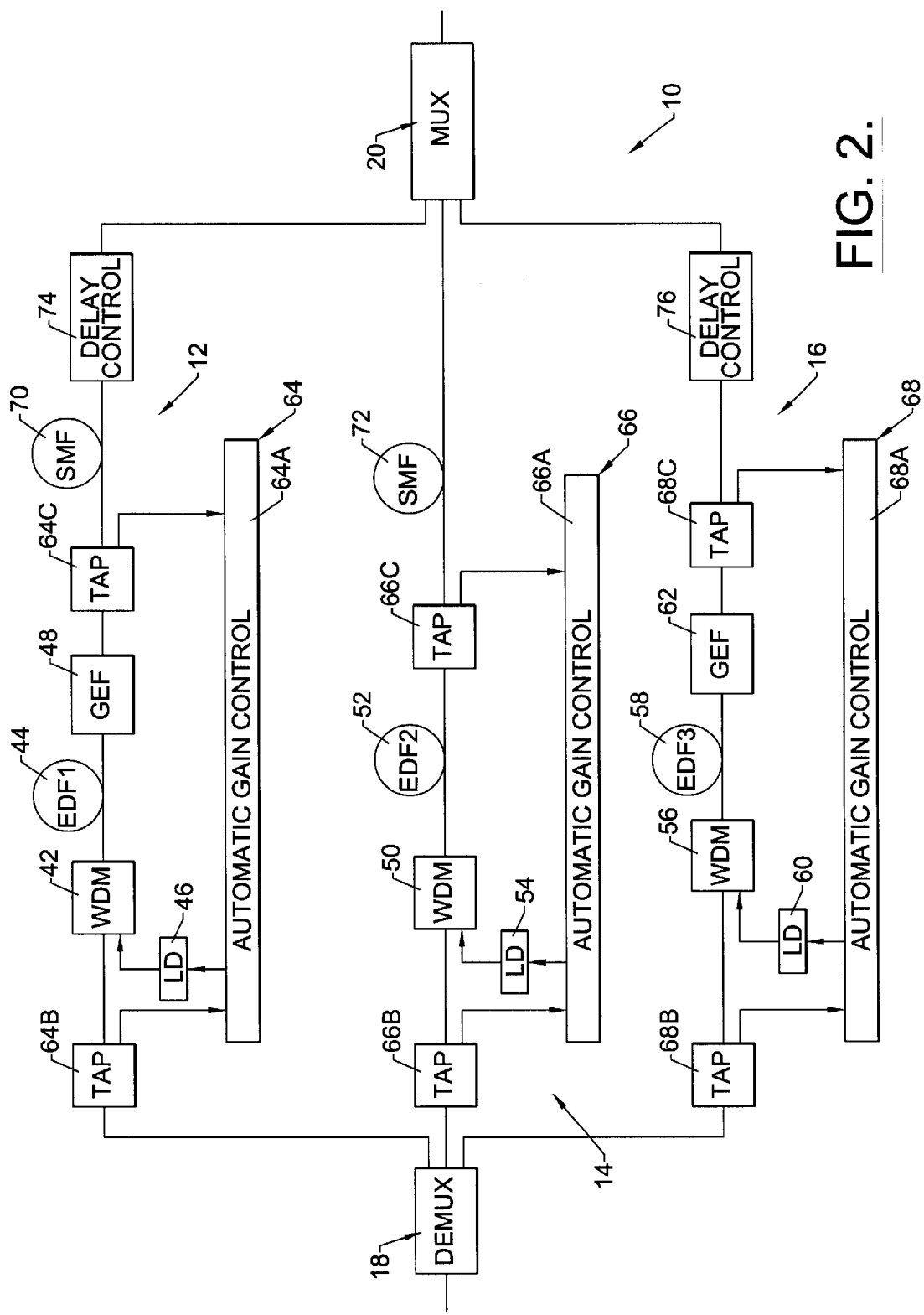
FIG. 2 is a detailed schematic illustration thereof.

Referring now to the drawings the ultra-wide bandwidth fiber based optical amplifier of the instant invention is illustrated and generally indicated at 10 in FIGS. 1–2. As will hereinafter be more fully described, the present invention seeks to solve the prior art shortcomings by dividing the erbium wavelength band into three separate bandwidths, 1520 nm–1541 nm (C1 band), 1541–1565 (C2 band) and 1565–1610 (L band) and separately amplifying each bandwidth with a specially designed amplifier block optimized to provide a flat gain spectrum within the limited bandwidth. The amplifier 10 then recombines the separately amplified band to provide an ultra-wide bandwidth amplifier with a flat gain spectrum over the entire 90 nm bandwidth.

More specifically, the wide bandwidth optical amplifier 10 comprises first, second and third amplifier blocks, each generally indicated at 12, 14 and 16. A demultiplexer device generally indicated at 18, splits the 1.5 μm wavelength band into first (C1), second (C2) and third (L) bandwidths, and outputs the respective bandwidths to the input ends of the first, second and third amplifier blocks 12, 14, 16. The first bandwidth (C1) has a range from about 1520 nm to about 1541 nm, the second bandwidth (C2) has a range from about 1541 nm to about 1565 nm, and the third bandwidth (L) has a range from about 1565nm to about 1610 nm. A multiplexer device generally indicated at 20 connected to the output ends of the first, second and third amplifier blocks 12, 14, 16 recombines the first, second and third bandwidths after being amplified.

Figure 3:
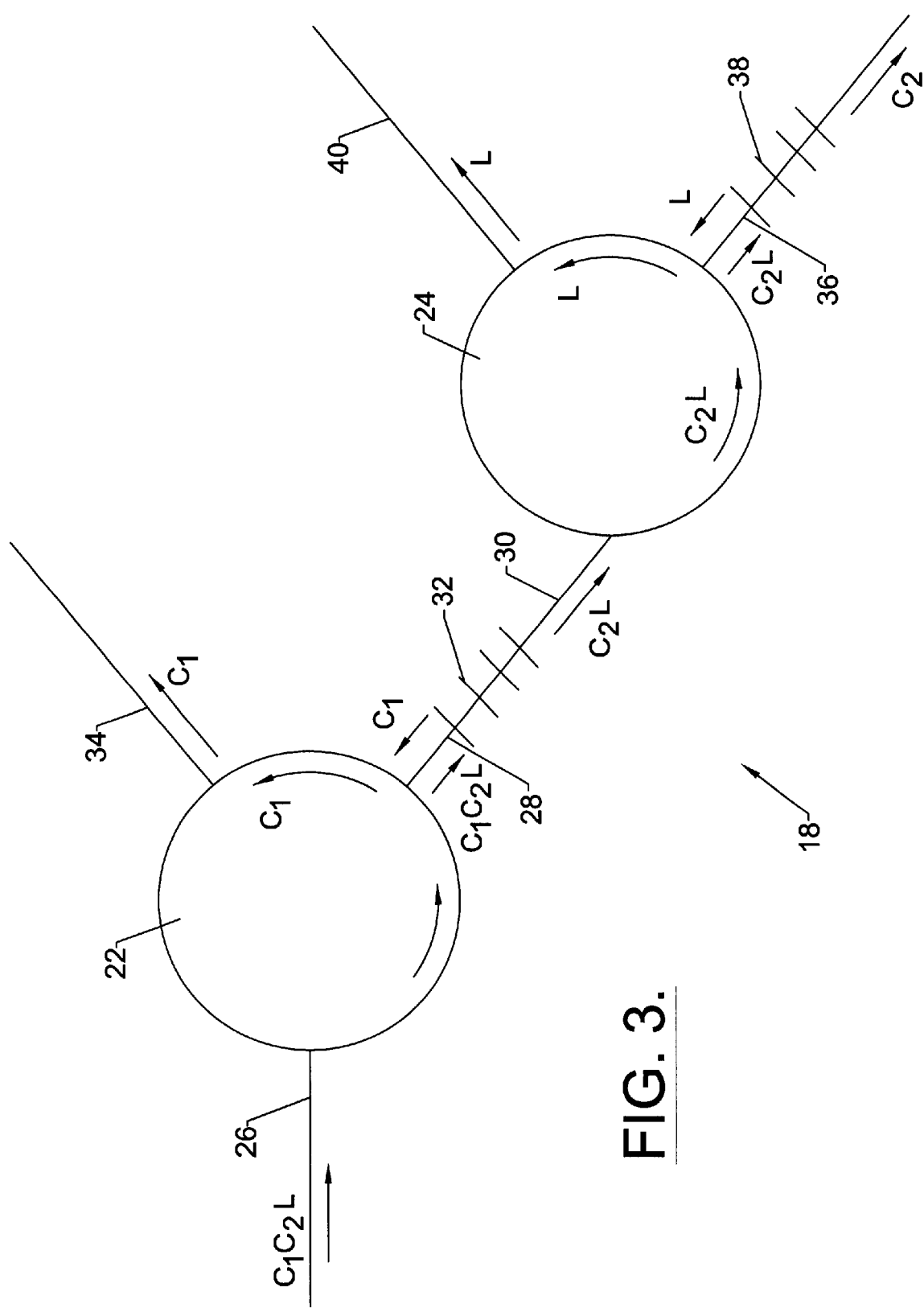
FIG. 3 is a schematic illustration of the demultiplexer device.

Referring to FIG. 3, the demultiplexer and multiplexer devices 18, 20 are not conventional multiplexing devices, but rather the devices 18, 20 are comprised of coupled optical circulators 22, 24. The demultiplexer device 18 is illustrated in detail in FIG. 3. The entire bandwidth 1520 nm to 1610 nm is fed into a first leg 26 of the first optical circulator 22. The second leg 28 of the circulator 22 is connected to a first leg 30 of the second optical circulator 24. This second leg 28 is provided with a wideband chirped Bragg grating 32 for reflecting the C1 band back through the first circulator 22. The reflected C1 band travels back through the first circulator 22 and is output on the third leg 34 of the first circulator 22 to the first amplifier block 12.

The Bragg grating 32 allows the C2 and L bands to pass through to the second circulator 24 where these bands circulate to the second leg 36 which is provided with a wideband chirped Bragg grating 38 for reflecting the L band. The C2 band is allowed to pass through the second leg 36 for output to the second amplifier block 14. The L band travels back through the second circulator 24 and is output on the third leg 40 of the second circulator 24 to the third amplifier block 16. The Bragg gratings 32 and 38 must have a reflectivity of greater than 80%, and more preferably greater than 95%. The multiplexer device 20 operates in reverse fashion to recombine the C1, C2 and L bands.

Turning to the amplifier blocks 12, 14, 16, the demultiplexed C1 band is received into the first amplifier block 12 and fed into the input end of a wavelength division multiplexer (WDM) 42. The first amplifier block 12 is optimized for amplifying the C1 band, and in this regard, the block 12 includes an erbium doped silica fiber (EDF1) 44 having a high concentration of aluminum of up to 6% by weight, and a length of between about 5 m to about 20 m, the actual length depending on the erbium doping concentration. The fiber 44 is optimized to provide a small signal gain of between 30 and 40 dB. The erbium doped fiber 44 is coupled to the output end of the WDM 42, and is pumped by a high power, optically pumped semiconductor pump laser 46. The laser 46 has a single spatial mode and delivers high pump power (0.5 W) into the single mode fiber. The pump signal is also fed into an input of the WDM 42 where it is combined with the existing signal to be amplified. Pump lasers 46 of the type contemplated are commercially available. Output from the erbium doped fiber 44 is passed through a gain equalization filter 48, such as a dielectric coating, or long period grating, to provide a gain flatness of less than 1 dB.

The C2 band is received into the second amplifier block 14 and fed into the input end of another wavelength division multiplexer (WDM) 50. The second amplifier block 14 is optimized for amplifying the C2 band and in this regard includes an erbium doped silica fiber (EDF2) 52 having a medium concentration of aluminum of up to 4% by weight and a length of between about 5 m to about 20 m, preferably about 10 m, but again the actual length depending on the erbium doping concentration. Existing erbium fiber designs for this wavelength range allow the gain profile of the C2 band to have a gain flatness of <1 dB with a 25 dB gain could be used for this application without the further use of any external gain equalization filters, whereas, the C1 band amplifier block and the L band amplifier block each utilize a gain equalization filter to provide about the same gain and flatness. The erbium doped fiber 52 is coupled to the output end of the WDM 50, and is pumped by a high power optically pumped semiconductor pump laser 54 as described hereinabove.

The L band is received into the third amplifier block 16 and fed into the input end of yet another wavelength division multiplexer (WDM) 56. The third amplifier block 16 is optimized for amplifying the L band and in this regard includes an erbium doped silica fiber (EDF3) 58 having a concentration of aluminum of up to 6% by weight and a length of between about 40 m to about 200 m, the fiber length being scaled to the erbium doping concentration. The fiber 58 is optimized to provide a gain of about 25 dB with a gain flatness of less than 5 dB. The erbium doped fiber 58 is coupled to the output end of the WDM 56, and is pumped by a high power optically pumped semiconductor pump laser 60 as described hereinabove. The pump signal is also fed into an input of the WDM 56 where it is combined with the existing signal to be amplified. Output from the erbium doped fiber 58 is passed through a gain equalization filter 62 to provide a gain flatness of less than 1 dB.

Each of the amplifier blocks 12, 14, 16 further include automatic gain control systems, generally indicated at 64, 66, and 68 respectively, which maintain constant gain for each channel, irrespective of variations in input power and number of channels. Each of the gain control systems 64, 66, 68 includes a gain control circuit 64A, 66A, 68A, an input tap 64B, 66B, 68B (fused fiber coupler with 1% tap), and an output tap 64C, 66C, 68C (fused fiber coupler with 1% tap). For each amplifier block 12, 14, the input taps 64B, 66B, 68B are located in the path between the demultiplexer 18 and the respective WDM whereby they tap the preamplified signal input directly from the demultiplexer 18. The output taps 64C, 66C, 68C are located in the paths after the erbium doped fibers whereby they tap the amplified signal. Outputs from the taps are fed into the gain control circuits 64A, 66A, 68A which are turn is connected to the laser diodes 46, 54, 60 to respectively control output within each block. The gain control circuits, and the general gain control arrangement is conventional in the art.

Turning now to the elimination of multipath interference when recombining the three separate signals, each amplifier block 12, 14, 16 is constructed to have the same optical transmission path length regardless of the different lengths of the erbium doped fibers 44, 52, 58 required for optical amplification in each block. In this regard, the L band erbium fiber 58 is significantly longer (100 m) than the erbium fibers 44, 52 required for either of the C1 and C2 bands (15 m). Since the L band has the longest erbium doped fiber 58, it is used as the basis for the standard length of the optical transmission path. The optical transmission lengths of the C1 and C2 band amplifier blocks are each lengthened using a respective length of single mode fiber 70, 72 spliced into the respective amplifier block 12, 14. The length of the single mode fibers 70, 72 can range from 5–100 m depending on the length of the L band amplifier block. In accordance with the described embodiment, the length of the single mode extension fiber 70 for the first amplifier block is about 15 m, and the length of the single mode extension fiber 72 for the second amplifier block is also about 15 m. These lengths of single mode fiber allow the optical transmission paths of the C1 and C2 bands to roughly approximately the length of the optical transmission path of the L band. Fine tuning of the optical transmission path length is accomplished by the use of additional delay control devices 74, 76, inserted respectively into each of the C1 and L amplifier blocks to selectively delay signals passing through these amplifier blocks 12, 16. Delay control devices of the type contemplated herein include piezoelectric distance controls, fiber stretchers, and lithium niobate crystals, as well as other known, and as yet unknown devices for delaying signals in an optical fiber. In the preferred embodiment, the delay controls 74, 76 comprise piezoelectric fiber stretchers which are commonly available in the industry. The use of these highly sensitive and selectively controllable delay devices permit fine tuning of the wavelength recombination and substantially reduce, or eliminate MPI.

In operation, a modulated wavelength band of 1520 nm–1610 nm having 225 or more data channels ($\Delta\lambda=0.4$ nm), is passed into the demultiplexer, the wavelength band is broken into the respective C1, C2 and L bands and channeled through the respective amplifier block for amplification. Once amplified, the signals are passed through the multiplexer and recombined for further transmission. Since the optical transmission path lengths of each amplifier block have been equalized by the use of the single mode fibers 70, 72 and the delay control devices 74, 76, there is no multipath interference, and no loss of bandwidth during recombination.

It can therefore be seen that the present invention provides an ultra-wide bandwidth fiber based optical amplifier having a flat gain spectrum over the entire 1525 nm–1610 nm bandwidth. The approach described herein combines a known technologies with further experimental technologies to provide an optical amplifier having over 90 nm of available bandwidth. The use of high power pump lasers allows for an increased number of channels, without reduction in power per channel. The use of the high power pump lasers (0.5 V) providing a factor of 5 increase, combined with the launching power into three separate amplifiers, providing a factor of 3 increase, implies that the total number of useful channels (or output power from the amplifier) will be 15 times more than a standard amplifier. The use of additional lengths of single mode fibers in the C1 and C2 amplifier blocks and the further use of delay control devices minimizes and/or eliminates multi-path interference (MPI) when recombining the bandwidths. The optimized amplifier blocks cooperate to provide a wideband gain of 25 to 40 dB per channel with a consistent low, noise of <6 dB across the entire band, and gain flatness of <1 dB for all useful channels. An automatic gain control provides for uniform gain during operation. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A wide band optical amplifier assembly comprising:
   a first amplifier block;
   a second amplifier block;
   a demultiplexing device for splitting a wavelength band into first and second bandwidths, said first and second bandwidths being respectively output to said first and second amplifier blocks; and
   a multiplexing device connected to said first and second amplifier blocks for recombining said first and second bandwidths,
   said first amplifier block having an optical transmission path length measured between said demultiplexer and said multiplexer, said first amplifier block including an optical amplifier assembly constructed and arranged for amplifying the first bandwidth, said first optical amplifier assembly including a rare earth doped fiber having a predetermined length,
   said second amplifier block having a second optical transmission path length measured between said demultiplexer and said multiplexer, said second amplifier block including an optical amplifier assembly constructed and arranged for amplifying the second bandwidth, said optical amplifier assembly of said second amplifier block including a rare earth doped fiber having a length which is less than the length of said rare earth doped fiber of said optical amplifier assembly of said first amplifier block, said second amplifier block further including a single mode fiber coupled to said rare earth doped fiber, said single mode fiber having a predetermined length such that the optical transmission path lengths of said first and second amplifier blocks are substantially equal to thereby reduce multipath interference when recombining said first and second bandwidths.

2. The optical amplifier assembly of claim 1 wherein said second amplifier block includes a delay control device for selectively delaying transmission of a signal through said second amplifier block.

3. The optical amplifier assembly of claim 1 wherein said first amplifier block includes a delay control device for selectively delaying transmission of a signal through said first amplifier block.

4. The optical amplifier assembly of claim 3 wherein said second amplifier block includes a delay control device for selectively delaying transmission of a signal through said second amplifier block.

5. A wide bandwidth optical amplifier for the 1.5 $\mu$m optical band comprising:
   first, second and third amplifier blocks;
   a demultiplexer device for splitting the 1.5 $\mu$m wavelength band into first, second and third bandwidths, said first, second and third bandwidths being respectively output to said first, second and third amplifier blocks, said first bandwidth having a range from about 1520 nm to about 1541 nm, said second bandwidth having a range from about 1541 nm to about 1565 nm, and said third bandwidth having a range from about 1565 nm to about 1610 nm; and
   a multiplexer connected to said first, second and third amplifier blocks for recombining said first, second and third bandwidths, said first amplifier block including an optical amplifier assembly constructed and arranged for amplifying the first bandwidth with a substantially flat gain profile,
   said optical amplifier of said first amplifier block including an erbium doped silica fiber having a high concentration of aluminum, and a length of about 5 m to about 20 m, said first amplifier block further including a single mode silica fiber having a length of about 25 m to about 40 m,
   said second amplifier block including an optical amplifier assembly constructed and arranged for amplifying the second bandwidth with a substantially flat gain profile, said optical amplifier of said second amplifier block including an erbium doped silica fiber having a medium concentration of aluminum and a length of about 5 m to about 20 m, said second amplifier block further including a single mode silica fiber having a length of about 10 m to about 50 m,
   said third amplifier block including an optical amplifier assembly constructed and arranged for amplifying the third bandwidth with a substantially flat gain profile, said optical amplifier of said third amplifier block including an erbium doped silica fiber having a length of about 80 m to about 200 m.

6. A wide bandwidth optical amplifier for the 1.5 $\mu$m optical band comprising:
   first, second and third amplifier blocks;
   a demultiplexer device for splitting the 1.5 $\mu$m wavelength band into first, second and third bandwidths, said first, second and third bandwidths being respectively output to said first, second and third amplifier blocks, said first bandwidth having a range from about 1520 nm to about 1541 nm, said second bandwidth having a range from about 1541 nm to about 1565 nm, and said third bandwidth having a range from about 1565 nm to about 1610 nm;

a multiplexer device connected to said first, second and third amplifier blocks for recombining said first, second and third bandwidths;

said third amplifier block including an optical amplifier assembly constructed and arranged for amplifying the third bandwidth with a substantially flat gain profile, said third amplifier block having an optical transmission path length measured between said demultiplexer and said multiplexer, said third optical amplifier assembly including a rare earth doped fiber having a predetermined length, said first amplifier block having an optical transmission path length measured between said demultiplexer and said multiplexer, said first amplifier block including an optical amplifier assembly constructed and arranged for amplifying the first bandwidth with a substantially flat gain profile, said first amplifier block including an optical amplifier assembly constructed and arranged for amplifying the first bandwidth with a substantially flat gain profile, said optical amplifier assembly of said first amplifier block including a rare earth doped fiber having a length which is less than the length of said rare earth doped fiber of said optical amplifier assembly of said third amplifier block, said first amplifier block further including a single mode fiber coupled to said rare earth doped fiber, said single mode fiber having a predetermined length such that the optical transmission path lengths of said first and said third amplifier blocks are substantially equal to thereby reduce multipath interference when recombining said bandwidths, said second amplifier block having an optical transmission path length measured between said demultiplexer and said multiplexer, said second amplifier block including an optical amplifier assembly constructed and arranged for amplifying the second bandwidth with a substantially flat gain profile, said optical amplifier assembly of said second amplifier block including a rare earth doped fiber having a length which is less than the length of said rare earth doped fiber of said optical amplifier assembly of said third amplifier block, said second amplifier block further including a single mode fiber coupled to said rare earth doped fiber, said single mode fiber having a predetermined length such that the optical transmission path lengths of said first, second and said third amplifier blocks are substantially equal to thereby reduce multipath interference.

7. The wide bandwidth optical amplifier assembly of claim 6 wherein said first amplifier block includes a delay control device for selectively delaying transmission of a signal through said first amplifier block.

8. The wide bandwidth optical amplifier assembly of claim 6 wherein said third amplifier block includes a delay control device for selectively delaying transmission of a signal through said third amplifier block.

9. The wide bandwidth optical amplifier assembly of claim 7 wherein said third-amplifier block includes a delay control device for selectively delaying transmission of a signal through said third amplifier block.

10. The wide bandwidth optical amplifier assembly of claim 6 wherein said first amplifier block further includes a gain equalization filter.

11. The wide bandwidth optical amplifier assembly of claim 6 wherein said third amplifier block includes a gain equalization filter.

12. The wide bandwidth optical amplifier assembly of claim 11 wherein said third amplifier block includes a gain equalization filter.

13. The ultra-wide bandwidth fiber based optical amplifier of claim 6 wherein each of said first, second and third amplifier blocks includes an automatic gain control circuit for maintaining constant gain throughout said respective bandwidth.

14. The ultra-wide bandwidth fiber based optical amplifier of claim 7 wherein each of said first, second and third amplifier blocks includes an automatic gain control circuit for maintaining constant gain throughout said respective bandwidth.

15. The ultra-wide bandwidth fiber based optical amplifier of claim 8 wherein each of said first, second and third amplifier blocks includes an automatic gain control circuit for maintaining constant gain throughout said respective bandwidth.

16. The ultra-wide bandwidth fiber based optical amplifier of claim 9 wherein each of said first, second and third amplifier blocks includes an automatic gain control circuit for maintaining constant gain throughout said respective bandwidth.

17. The ultra-wide bandwidth fiber based optical amplifier of claim 10 wherein each of said first, second and third amplifier blocks includes an automatic gain control circuit for maintaining constant gain throughout said respective bandwidth.

18. The ultra-wide bandwidth fiber based optical amplifier of claim 11 wherein each of said first, second and third amplifier blocks includes an automatic gain control circuit for maintaining constant gain throughout said respective bandwidth.

19. The ultra-wide bandwidth fiber based optical amplifier of claim 12 wherein each of said first, second and third amplifier blocks includes an automatic gain control circuit for maintaining constant gain throughout said respective bandwidth.

* * * * *